(12) United States Patent
Bass et al.

(10) Patent No.: US 6,952,424 B1
(45) Date of Patent: Oct. 4, 2005

(54) METHOD AND SYSTEM FOR NETWORK PROCESSOR SCHEDULING OUTPUTS USING QUEUEING

(75) Inventors: Brian Mitchell Bass, Apex, NC (US);
Jean Louis Calvignac, Cary, NC (US);
Marco C. Heddes, Raleigh, NC (US);
Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,912

(22) Filed: Apr. 13, 2000

(51) Int. Cl.[7] .............................................. H04L 12/28
(52) U.S. Cl. ........................ 370/412; 370/428; 710/56
(58) Field of Search .............................. 370/229, 230,
370/230.1, 231, 232, 233, 234, 235, 235.1,
370/389, 392, 395.1, 395.4, 395.41, 395.42,
370/401, 412, 415, 416, 417, 418, 428, 429,
370/465, 468; 710/52, 54, 55, 56, 5, 6

(56) References Cited

U.S. PATENT DOCUMENTS

| | | | |
|---|---|---|---|
| 5,367,523 A | | 11/1994 | Chang et al. |
| 5,526,345 A | * | 6/1996 | Wallmeier ................ 370/395.4 |
| 5,629,937 A | * | 5/1997 | Hayter et al. ................ 370/233 |
| 5,689,508 A | | 11/1997 | Lyles |
| 5,734,650 A | * | 3/1998 | Hayter et al. ................ 370/391 |
| 5,748,614 A | * | 5/1998 | Wallmeier ............. 370/395.41 |
| 5,781,531 A | | 7/1998 | Charny |
| 5,793,747 A | | 8/1998 | Kline |
| 5,835,494 A | * | 11/1998 | Hughes et al. ............... 370/397 |
| 5,850,399 A | | 12/1998 | Ganmukhi et al. |
| 5,859,835 A | * | 1/1999 | Varma et al. ................ 370/229 |
| 5,917,822 A | | 6/1999 | Lyles et al. |
| 5,923,644 A | | 7/1999 | McKeon et al. |
| 5,923,656 A | | 7/1999 | Duan et al. |
| 5,926,459 A | | 7/1999 | Lyles et al. |
| 5,940,375 A | | 8/1999 | Soumiya et al. |
| 5,959,993 A | | 9/1999 | Varma |
| 5,995,511 A | | 11/1999 | Zhou et al. |

(Continued)

FOREIGN PATENT DOCUMENTS

EP          0944208          9/1999          ........... H04L 12/56

(Continued)

OTHER PUBLICATIONS

PCT International Search Report dated Nov. 6, 2001.

*Primary Examiner*—Bob A. Phunkulh
(74) *Attorney, Agent, or Firm*—Joscelyn G. Cockburn

(57) ABSTRACT

A system and method of moving information units from a network processor toward a data transmission network in a prioritized sequence which accommodates several different levels of service. The present invention includes a method and system for scheduling the egress of processed information units (or frames) from a network processing unit according to stored priorities associated with the various sources of the information units. The priorities in the preferred embodiment include a low latency service, a minimum bandwidth, a weighted fair queueing and a system for preventing a user from continuing to exceed his service levels over an extended period. The present invention includes a weighted fair queueing system where the position of the next service in a best efforts system for using bandwidth which is not used by committed bandwidth is determined based on the length of the frame and the weight of the particular flow. A "back pressure" system keeps a flow from being selected if its output cannot accept an additional frame because the current level of that port queue exceeds a threshold.

19 Claims, 5 Drawing Sheets

U.S. PATENT DOCUMENTS

| | | | |
|---|---|---|---|
| 5,996,019 A | 11/1999 | Hauser et al. | |
| 6,018,527 A * | 1/2000 | Yin et al. | 370/395.41 |
| 6,031,822 A * | 2/2000 | Wallmeier | 370/235 |
| 6,101,193 A * | 8/2000 | Ohba | 370/429 |
| 6,262,986 B1 * | 7/2001 | Oba et al. | 370/399 |
| 6,320,845 B1 * | 11/2001 | Davie | 370/230 |
| 6,438,134 B1 * | 8/2002 | Chow et al. | 370/412 |
| 6,452,933 B1 * | 9/2002 | Duffield et al. | 370/415 |
| 6,470,016 B1 * | 10/2002 | Kalkunte et al. | 370/395.41 |
| 6,567,415 B1 * | 5/2003 | Elwalid et al. | 370/412 |

FOREIGN PATENT DOCUMENTS

| | | | |
|---|---|---|---|
| WO | WO 97/14240 | 4/1997 | H04L 12/56 |

* cited by examiner

METHOD AND SYSTEM FOR NETWORK PROCESSOR SCHEDULING OUTPUTS USING QUEUEING

The present invention is related to the following documents, all of which are assigned to the assignee of the present invention and which are specifically incorporated herein by reference:

Patent application Ser. No. 09/384,691, filed Aug. 27, 1999 by Brian Bass et al., entitled "Network Processor Processing Complex and Methods", sometimes referred to herein as the Network Processing Unit Patent or NPU Patent.

U.S. Pat. No. 5,724,348 entitled "Efficient Hardware/Software Interface for a Data Switch" issued Mar. 3, 1998, which patent is sometimes referred to herein as the Interface Patent.

Patent application Ser. No. 09/330,968 filed Jun. 11, 1999 and entitled "High Speed Parallel/Serial Link for Data Communications", sometimes referred to as the Link Patent.

Various patents and applications assigned to IBM for its multiprotocol switching services, sometimes referred to as "MSS", some of which include Cedric Alexander as an inventor, and are sometimes referred to as the MSS Patents.

Patent application Ser. No. 09/548,907 filed concurrently by Brian M. Bass et al. and entitled "Method and System for Network Processor Scheduler". This patent is sometimes referred to herein as the Scheduler Structure Patent.

Patent application Ser. No. 09/548,910 filed concurrently by Brian M. Basset al. and entitled "Method and System for Network Processor Scheduling Outputs Based on Multiple Calendars". This patent is sometimes referred to herein as the Calendar Scheduling Patent.

Patent application Ser. No. 09/548,911 filed concurrently by Brian M. Basset al. and entitled "Method and System for Network Processor Scheduling Based on Calculation". This patent is sometimes referred to herein as the Calculation Patent.

Patent application Ser. No. 09/834,141 filed concurrently by Brian M. Bass et al. and entitled "Method and System for Network Processor Scheduling Based on Service Levels". This patent is sometimes referred to herein as the Service Level Patent.

Patent application Ser. No. 09/548,913 filed concurrently by Brian M. Bass et al. and entitled "Method and System for Network Processor Scheduling Outputs using Disconnect/Reconnect Flow Queues". This patent is sometimes referred to herein as the Reconnection Patent.

Patent application Ser. No. 09/546,651 filed Apr. 10, 2000 by Brian M. Bass et al. and entitled "Method and System for Minimizing Congestion in a Network". This patent is sometimes referred to herein as the Flow Control Patent.

Patent application Ser. No. 09/547,280 filed Apr. 11, 2000 and entitled "Unified Method and System for Scheduling and Discarding Packets in Computer Networks". This patent is sometimes referred to herein as the Packet Discard Patent.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for scheduling the distribution of information units from a flow control system coupled to a plurality of network processing units toward a data transmission network through a MAC. More particularly, the present invention involves scheduling using a plurality of calendars to handle a plurality of users who are processing variable size information packets or frames, providing an order to the frames being provided from the flow control system (which may be of the type described in the referenced Flow Control Patent) toward the data transmission network while allowing for a plurality of different priorities to be accorded to the different users.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost. Technologies such as voice over IP (VoIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or frame header methods). Those using a resource will consider the quality of service as well as the cost of service, with the tradeoffs depending on the situation presented. It is desirable to allow a variety of different priorities or scheduling algorithms to a user, with the user deciding whether he wants (and will pay the charges associated with) a guaranteed bandwidth, best efforts, or a guaranteed bandwidth with best efforts for peak. In addition, it is desirable that a system for allocating bandwidth have a system for enforcing the priorities and bandwidth which has been selected by a user by denying the user capacity in excess of that which the user has selected and paid for.

Some prior art systems handle outgoing information units from a processing system in a variety of ways. One suggestion is to use a round robin scheduler which fairness amongst a set of queues. Another one employs several different levels of priorities and a queue for each. In such a system, you have an absolute priority where the highest priority work is processed first and the lowest priority work may never get serviced. Still another method of scheduling outputs involves a plurality of prioritized lists. It is also known to use a hierarchical packet scheduling system. There are even systems which use several different scheduling methods in determining the order in which information units are to be sent toward a data transmission network, using a combination of different scheduling techniques.

Other systems have used a weighted priority technique implemented in the form of a round robin—which serves all queues, with some queues served more frequently than other queues, based on an algorithm which defines the level of service. Even such a weighted priority system would provide service to a user who continually exceeds the service levels assigned to it, continuing to serve, albeit less often, even as it exceeds the assigned service level and making it difficult for the system to enforce a level of service policy.

Considering the size of a packet or frame in determining which customers to serve adds a measure of fairness to a service system, in that a user who is processing large frames takes up more of the system capacity and therefore should receive service less often than a user with small frames. Some of the prior art systems consider the size of the transmission in allocating resources, while others do not. Some communication systems use a uniform, fixed-size packet, making consideration of packet size unnecessary, but others do not consider the size of the packet in allocating resources.

Other prior art system are directed to handling information units which are of a common size as in the so-called Asynchronous Transfer Mode (or ATM) system, so that size of the information unit is not considered in determining the priority of the current or a future information unit. An ATM system with a weight-driven scheduler is one of the solutions which is known in the prior art to schedule outputs from an ATM system.

In any such system, it would be desirable to accommodate system constraints like allocating a certain guaranteed bandwidth to a customer regardless of frame size while providing a mechanism to provide the following additional features: accommodating peak inputs which exceed the guaranteed bandwidth while providing protection for large and persistent exceeding of a system parameter and yet efficiently and equitably use the capacity of the network processor to provide outputs to the data transmission network.

The prior art systems in general either do not efficiently schedule bandwidth using varying frame size or do not have the flexibility to allow varying user capabilities or configurations. Thus, the prior art systems have disadvantages or limitations.

SUMMARY OF THE INVENTION

The present invention overcomes the disadvantages and limitations of the prior art systems by providing a simple, yet effective, way of handling information units or frames coming out of a processing system and directing frames to output ports for dispatch to a data transmission network. The present invention has particular application to a system in which packets of variable length are being handled from a plurality of users and where a level of service commitment has been made to at least some of the users.

The present invention allows the use of multiple types of service level agreements or commitments made to different users of the system. That is, a minimum guaranteed bandwidth could be provided to one user while other users enjoy shared bandwidth, a peak bandwidth could be permitted for a limited duration of time and maximum burst level service could be provided to a user, all as programmed and without interfering with the service provided to other users.

The present invention has the advantage that it allows the efficient use of bandwidth resource and allows for service level commitments to be fulfilled while allowing any remaining bandwidth to be used efficiently and equitably.

The present invention also has the advantage of enforcing resource allocations while accommodating bursts. That is, a user can transmit some amount of traffic at a burst rate which exceeds his defined bandwidth for a limited period of time, but, if the user does so for a prolonged period, that user is prohibited from transmitting in excess of his normal bandwidth until he has compensated for the excessive usage. This is accomplished through a system of "credits" for the flow queue for the respective user which have built up while the user was not using his full bandwidth.

The present system also has the advantage of providing a push down stack in which the latest request for service scheduled for a given time slot or cycle is given priority. This is based on the assumption that the user scheduled later must have a higher priority and any delay in serving that user would be a greater percentage delay than a similar delay in serving a lower priority user. Use of this last-in-first-out (LIFO) system for fulfilling slot requests allows the system to minimize the perceived delay in service as a percentage of the normal intervals between successive service when the system is overloaded, that is, it has more work than can be handled at the scheduled time.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
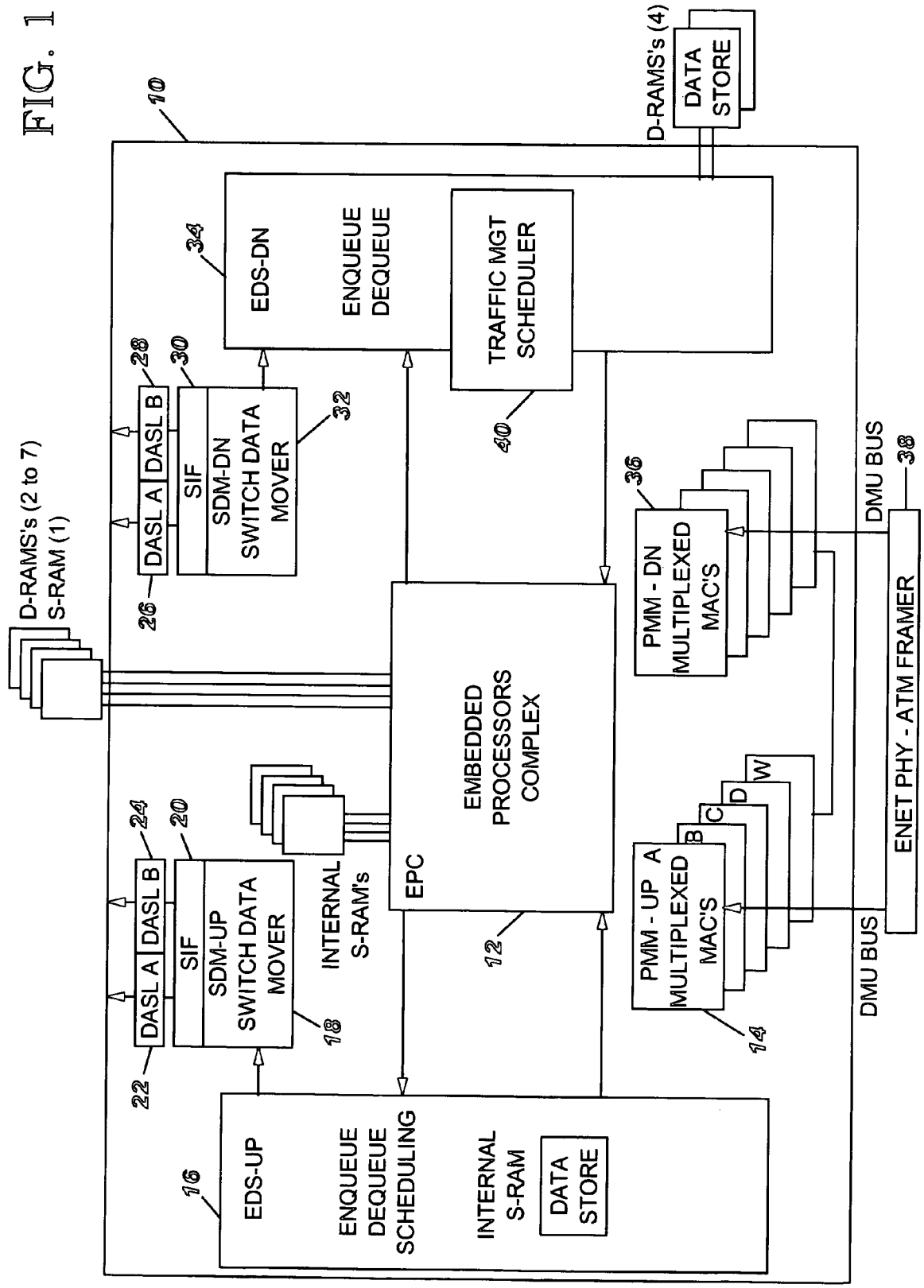
FIG. 1 is a block diagram for an interface device including embedded processor complex which is described in the NPU Patent, showing a DN Enqueue System and Scheduler useful in practicing the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, System Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, switch interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors. After the input units or frames are processed by one of the plurality of processors in the embedded processor complex, the completed information units are sent to the switch to be delivered to an egress side of a network processor. Once the information units are received on the egress side of the network processor, they are processed by one of the plurality of processors in the embedded processor complex, and when the egress processing is completed, they are scheduled through the scheduler 40 out of the processing unit 10 and onto the data transmission network through the PMM-DN multiplexed MAC's 36 and the physical layer 38.

Figure 2:
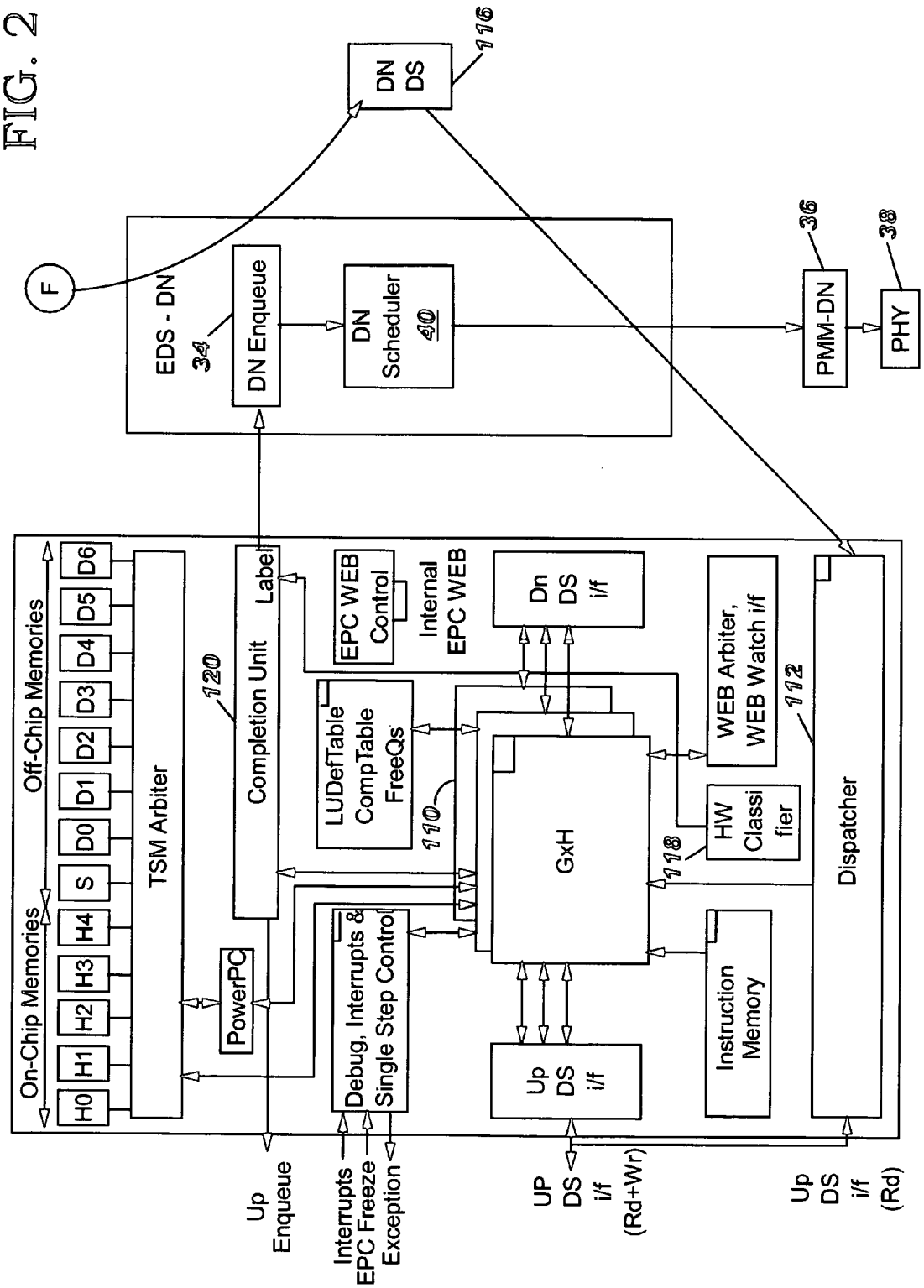
FIG. 2 is a block diagram of an embedded processor complex of type shown in FIG. 1, with the DN Enqueue (and its included Scheduler) useful in understanding the present invention.

FIG. 2 is a block diagram of a processing system 100 which can employ the present invention to advantage. In this FIG. 2, a plurality of processing units 110 are located between a dispatcher unit 112 and a completion unit 114. Each egress frame F (from a switch, not shown, attached to the present data processing system) is received and stored into a DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled through the PMM DN MAC's 36, then by the DMU data bus to the physical layer 38 (the data transmission network itself).

The basic configuration and operation of the scheduler 40 of the present invention is described in the referenced Scheduler Structure Patent. The Scheduler Structure Patent described above discusses the environment of the present invention along with several time-based calendars for handling data flows.

Weighted fair queuing (WFQ) calendars are used torso-called "best effort" service, and, when used in combination with a time-based calendar, a so-called "best effort peak" service. That is, a best effort service obtains no guaranteed bandwidth (where x bits of bandwidth is provided every unit of time), but competes with the other users for the bandwidth remaining after the guaranteed bandwidth customers are satisfied. This is a lower level of service than guaranteed bandwidth and normally significantly less expensive. The so-called "best effort peak" service provides a competitive sharing of excess bandwidth on a resource for requirements above the guaranteed level of service which a user has subscribed. So, a user might buy 10 Mbits per second of service along with a best effort for a peak of an additional 5 Mbits, for a total peak service of 15 Mbits of service (the last 5 Mbits of service are provided if and only if it is available and a fair sharing with other users if the weighted fair queueing allows it).

Figure 3:
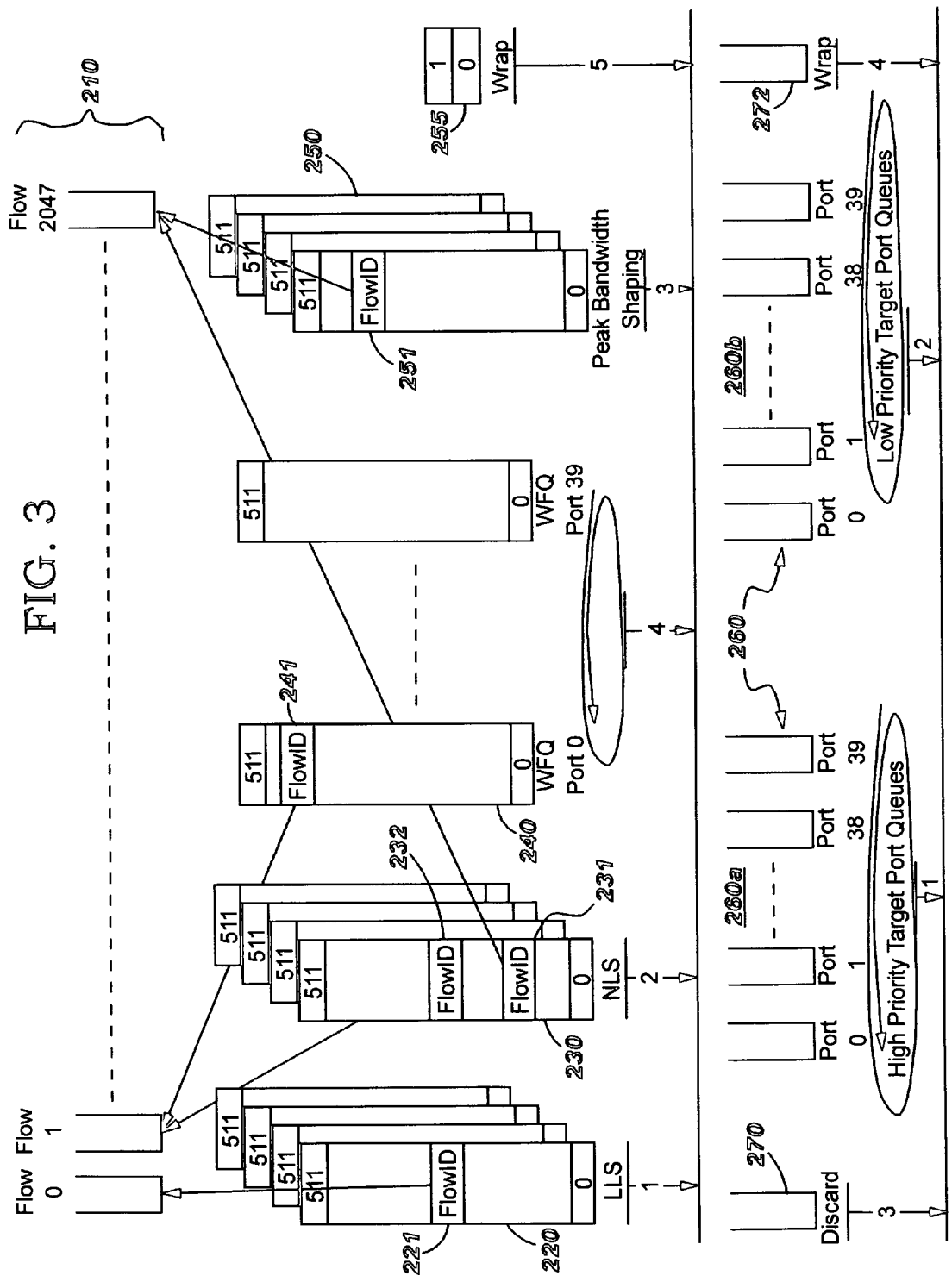
FIG. 3 illustrates a system for scheduling variable length packets according to the preferred embodiment of the present invention in the scheduler of FIG. 1.

Further, the WFQ calendars support a queue weight that allows support of different classes of service within a best effort service QoS class. As used herein, a queue weight is a relative priority which is assigned to a given user based on his level of service. The queue weight relates to the amount of delay between service in the weighted fair queueing system described in connection with this system. In the preferred embodiment, as illustrated in FIG. 3, there are 40 such WFQ calendars, corresponding to the number of supported media ports. The selection of 40 such ports is an arbitrary design choice which involves a trade off between hardware cost and design complexity and is not intended to limit the scope of the invention.

As described in the Scheduler Structure Patent a period (or clock interval) is defined as a scheduler_tick; this amounts to either 150 or 165 nanoseconds, depending on the response time of the hardware being accessed, but this could be greater or lesser period depending on design parameters and hardware capabilities. During a scheduler_tick a flow queue is selected for service. The selection algorithm described results in the WFQ calendars being selected when all flow queues with minimum bandwidth specifications (sustained service rate) do not require service (i.e., the leftover bandwidth managed by the scheduler is available for use by the WFQ calendars.) Put another way, the time-based calendars 220, 230 are served during each clock interval if they are scheduled and have information to transmit; if not, the WFQ queue 240 is served during the clock interval. In contrast to the timer based schedulers, where the total minimum bandwidth of the network processor may be managed, each WFQ calendar manages the best effort bandwidth for one target port. The purpose of the WFQ calendar 240 is to share fairly amongst competing flow queues this best effort bandwidth. This is accomplished by accounting for the number of bytes transmitted by a flow queue that is selected for service and moving the flow queue within the calendar a distance from its present location based on the number of bytes transmitted. That is, the more bytes that a flow transmits during a scheduler_tick, the farther up the calendar (and more intervening flows and thus the longer the period) before the next service.

Figure 4:
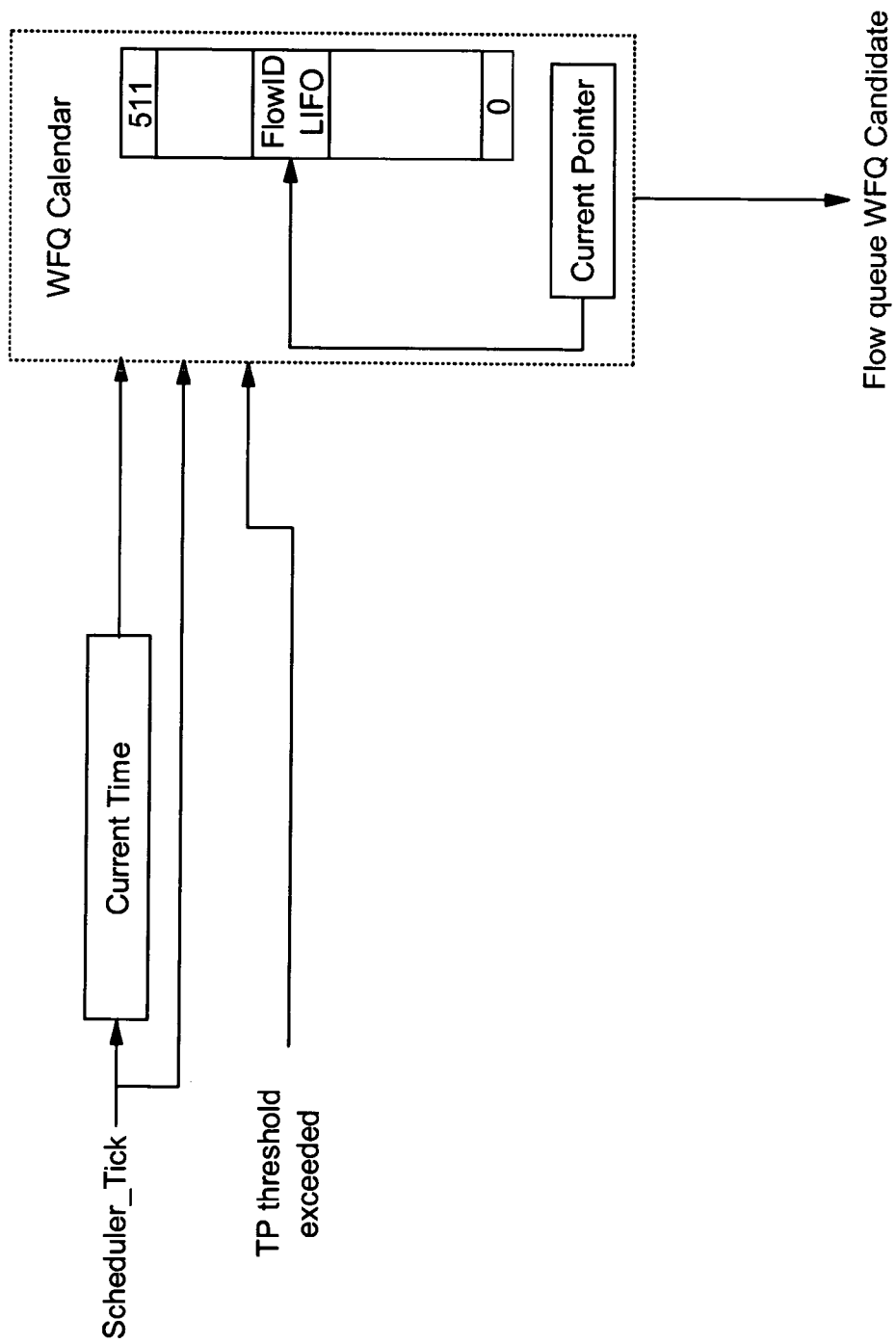
FIG. 4 illustrates a WFQ calendar according to the preferred embodiment of the present invention and useful in the scheduler of the present invention.

In the preferred embodiment, as shown in FIG. 4, a WFQ calendar 240*a* is comprised of 512 slots. Each slot contains a LIFO stack of pointers to flow queues. The number of slots utilized in an embodiment is a trade off between hardware cost and design complexity and is not intended to limit the scope of the invention.

Still referring to FIG. 4, current time is a register that maintains a value for the current scheduler system time. This register is incremented once per scheduler_tick. In the preferred embodiment, the range of the current time register is selected to be four times the range of the timer based calendars. This allows for the determination of a current time wrap when comparing the current time against one of the time stamp fields found in the flow queue control block (i.e. NextGreenTime).

The current pointer is used to indicate the service location within the WFQ calendar. In contrast to the timer based calendars, the current pointer is unrelated to the scheduler system time.

Operation

Figure 5:
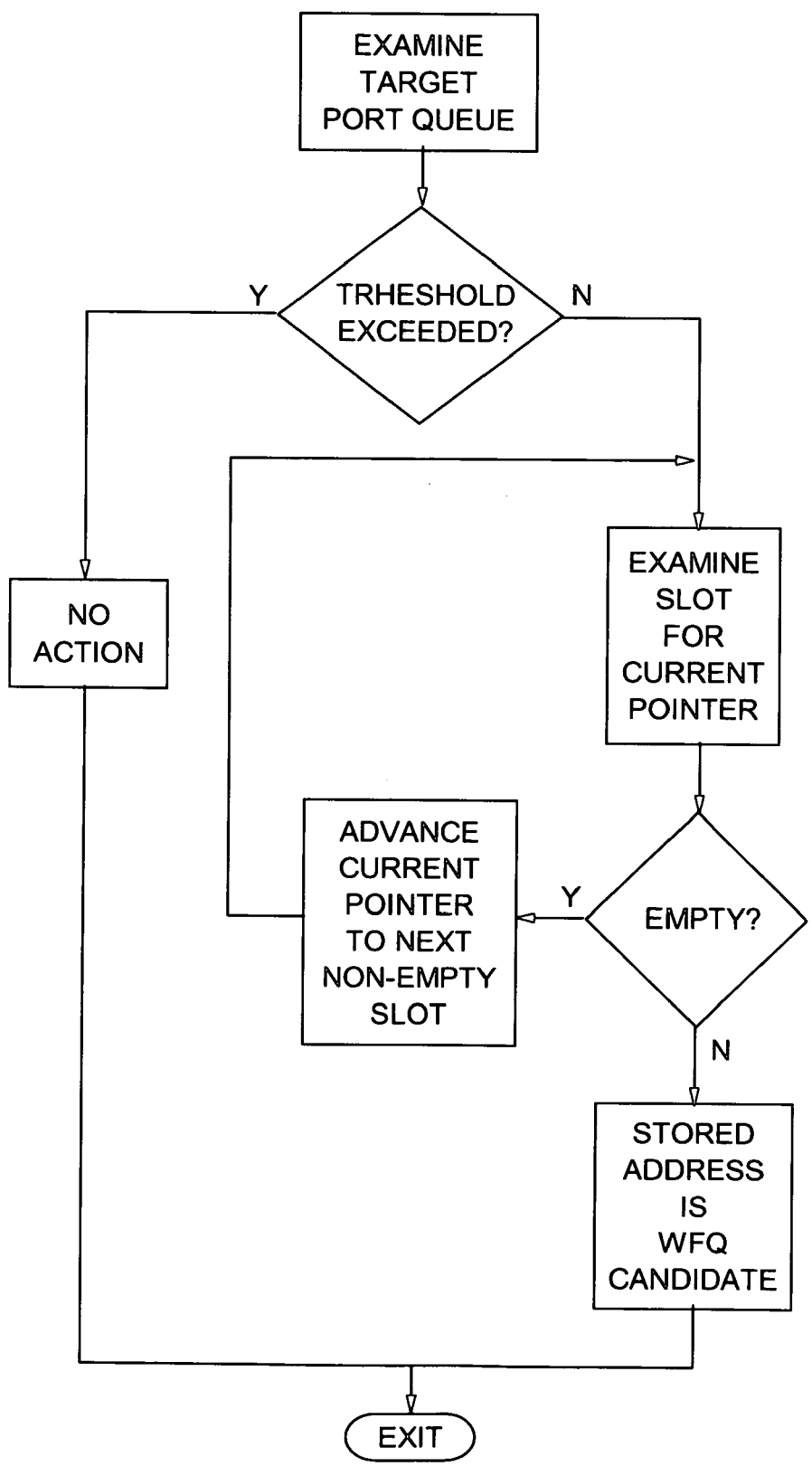
FIG. 5 illustrates a flow chart of the logic of scheduling operations used in connection with the scheduler of FIGS. 3–4.

As shown in the flow chart of FIG. 5, during each scheduler_tick, the state of each target port queue is first examined. Each of the WFQ calendars is associated with a pair of ports; thus, WFQ Port 0 is associated with a higher priority port 0 and a lower priority port 0. If the target port queue's threshold has been exceeded on line 262, no further action is taken by that WFQ calendar during the scheduler_tick. (This system provides a form of back pressure to limit the output, preventing frames from being sent out that the system can not handle.) If the target port queue's threshold has not been exceeded, the slot that is indicated by the current pointer is then examined. If the slot is found to be empty, then the current pointer may advance to the next non-empty slot to find a flow queue WFQ candidate. If all slots are found to be empty, the current pointer is unchanged and no candidate is found. If the slot is found to be non-empty within this one calendar, then the flow queue address in stored in the slot is the WFQ candidate for this port. Each of the 40 WFQ calendars will similarly be able to find a candidate for its associated target port queue.

The purpose of the examination of the target port threshold is to control the rate at which packets are assigned to the target port queue from the WFQ calendar. Since the target port queue will drain at the rate specified by the attached media, the examination of the status of the target port exceeding the threshold provides a mechanism that assures that the target port queue is not assigned packets at a rate exceeding its media's bandwidth. In the preferred embodiment, the threshold is defined as a measurement of bytes, and the threshold should be set to at least the maximum transmission unit (MTU) defined for the media in order to assure proper operation.

Since it is a goal of the invention to provide a method of best effort bandwidth scheduling in combination with minimum bandwidth, where a single flow queue is in both a time based calendar and a WFQ calendar, the above mechanism is necessary for proper function.

Final flow queue selection occurs amongst all the calendars (both time-based calendars and the WFQ calendars) as described in the Scheduler Structure Patent referred to above. When a flow queue WFQ candidate is selected, the flow queue pointer is de-queued from the LIFO stack. The flow queue is examined and serviced as described in the Scheduler Structure Patent. If the slot indicated by the current pointer is found to be non-empty after this de-queue action (i.e, at least one more entry exists in it), then the current pointer is not modified further. If the slot indicated by the current pointer is found to be empty after this de-queue action, then the current pointer will advance to the next non-empty slot. If all slots are found to be empty, the current pointer is unchanged.

As one skilled in the art will appreciate, a WFQ calendar shares available bandwidth amongst all flow queues assigned to it. Further, by assigning a weight to a flow queue, the relative proportion of bandwidth allocated to each flow queue can be altered. This is accomplished through the calculation of the location a non-empty serviced flow queue is placed. A low weight factor provides for more frequent service for a given frame length, meaning that the associated flow is moved a shorter distance up the "ladder" for the next service than a high weight factor for the same length of frame. Similarly, a flow providing longer frames will be moved a greater distance up the ladder than one providing shorter frames having the same weight factor, meaning that the one with shorter frames will receive more frequent service, given the same priority or weight factor.

WFQ Distance Calculation

A distance calculation is defined as the number of slots a flow queue is moved in the calendar from the location it is de-queued from. In the preferred embodiment, the distance calculation for the WFQ calendar has the form:

Slot distance=Max(Min(((Frame Length)*$QD$*$K$), max_distance), 1)

where the slot distance is an integer number, frame length is measured in bytes, QD is the queue weight specified in the flow queue control block, max_distance is defined as the number of slots in the calendar less 1, and K is a scaling factor assigned to the target port. Specification of K is determined from the MTU of the target port, the number of slots in the WFQ calendar, and the range of QD desired. For the preferred embodiment, the following values of K are recommended:

| MTU (Bytes) | K |
| --- | --- |
| 2048 | $1/64^{th}$ |
| 9216 | $1/256^{th}$ |
| 16384 | $1/1024^{th}$ |

Other values of K can be selected without departing from the spirit of the invention.

Of course, many modifications of the present invention will be apparent to those skilled in the relevant art in view of the foregoing description of the preferred embodiment, taken together with the accompanying drawings. For example, the weighting based on frame size and stored weighting factors can be replaced with other formulas. Also, the number of slots within a calendar and the number of calendars per port can be changed to accommodate the architecture of the system. Additionally, many modifications can be made to the system implementation and the system of priorities and various algorithms can be used for determining the next service without departing from the spirit of the present invention. Further, some of the features of the present invention can be used without the corresponding use of other features. Accordingly, the foregoing description of the preferred embodiment should be considered as merely illustrative of the principles of the present invention and not in limitation thereof.

Having thus described the invention, what is claimed is:

1. A method of selecting during any processing cycle one processed information unit from a plurality of information units ready at that time for transmission from a network processor toward a data transmission network, the method comprising:

receiving priority information about each of the information units ready for processing;

placing each information unit ready for transmission into one of several prioritized calendars based on the priority information associated with each processing unit, one of the calendars being time-based providing predefined number of bits of bandwidth per unit time and another one of the calendars being time independent not providing predefined number of bits per unit time;

selecting one of the calendars to service at each time cycle based on a stored set of rules and selecting one of the information units from the selected calendar according to an algorithm, said selection from a weighted fair queuing calendar including calculating a new position in the weighted fair queuing calendar based on the size of the packet and the weighting factor for the information unit selected; and sending the selected information unit to the network.

2. The method according to claim 1 further including providing a back pressure indicator signal to said weighted fair calendar when an output queue associated with said weighted fair calendar is not empty, preventing that output queue from being selected during the time cycle.

3. Apparatus for routing packets in a communications network comprising:

a plurality of queues in which information unit ready for transmission is being stored;

at least one time-based calendar being operable to select a queue from which a packet is to be transmitted in order to sustain a predefined bandwidth;

at least one time independent calendar providing non-guaranteed bandwidth services, said time independent calendar having spaced slots whereat queue pointers directly pointing to queues containing information units to be transmitted are being stored; and a current pointer, associated with the at least one time independent calendar, advancing at predefined time interval to select a slot whereat a queue being identified by one of said queue pointers is selected and an information unit is transmitted from the queue to an output destination.

4. The apparatus of claim 3 further including a processing unit responsive to a signal from the selected slot to identify a new slot whereat the identified queue is being placed for subsequent service.

5. The apparatus of claim 4 wherein the new location is calculated based upon the selected queue weighting factor and size of the transmitted information unit.

6. The apparatus of claim 3 further including a back pressure controller monitoring the output destination and inhibiting the time independent calendar from transmitting the information unit.

7. The apparatus of claim 6 wherein the back pressure controller includes at least one port queue and a threshold that limits the amount of information unit to be accommodated in said queue.

8. The apparatus of claim 7 wherein the amount of information unit is being determined based upon the transmission rate of a network to which information unit from said at least one port queue is to be transmitted.

9. The apparatus of claim 3 wherein a common set of queues are being serviced by the at least one time-based calendar and the at least one time independent calendar to provide best effort bandwidth and minimum bandwidth scheduling.

10. The apparatus of claim 4 or claim 11 wherein the at least one time independent calendar includes a weighted fair queuing (WFQ) calendar.

11. An apparatus comprising:
at least one time independent calendar, providing non-guaranteed bandwidth service, partitioned into multiple positions wherein each position stores information including at least one information pointer pointing directly to information sources containing information to be transmitted;
a current pointer that advances from one position to a next in response to control signals; and
a controller responsive to signals from a first position whereat the current pointer is aligned to identify a second position whereat the at least one information pointer is placed for future servicing after being detached from the first position.

12. The apparatus of claim 11 wherein the second position is determined based upon a weighting factor assigned to an information source and length of an information unit transmitted from said information source.

13. The apparatus of claim 11 wherein if an information source is present at a position to which the information pointer points an information unit is transferred from the information source to an output destination.

14. The apparatus of claim 13 wherein the information source includes flow queues.

15. The apparatus of claim 13 wherein the output destination includes port queues.

16. The apparatus of claim 15 further including a threshold signal generated when port queues exceed a predefined threshold and is used by said time independent calendar to temporarily cease transmitting information units from flow queue to target port queues.

17. The apparatus of claim 11 wherein the information sources include flow queues.

18. A method to route information units in a communications network comprising:
providing at least one calendar partitioned into a plurality of locations wherein each location being adapted to store queue pointers directly pointing to queues with information units ready for transmission;
selecting one of the locations by advancing a current pointer relative to the calendar at predefined time intervals;
examining the one of the locations;
transmitting an information unit from a queue having a queue pointer at said one of the locations to the network;
detaching the queue pointer from its current location; and
attaching said pointer to another location based upon an algorithm.

19. A method to route information units in a communications network comprising:
providing at least one calendar partitioned into a plurality of locations wherein each location being adapted to store pointers identifying queues with information units ready for transmission;
selecting one of the locations by advancing a current pointer relative to the calendar at predefined time intervals;
examining the one of the locations;
transmitting an information unit from a queue having a pointer at said one of the locations to the network;
detaching the pointer from its current location; and
attaching said pointer to another location based upon an algorithm including calculation of a distance based on queue weight assigned to the queue and number of bytes transmitted.

* * * * *